March 7, 1961

A. N. LAWSON 2,974,222

COMMUNICATION SYSTEMS

Filed March 28, 1958

Inventor
A.N. Lawson
By R.P. Morris
Attorney

United States Patent Office 2,974,222

Patented Mar. 7, 1961

2,974,222

COMMUNICATION SYSTEMS

Anthony Newton Lawson, London, England, assignor to International Standard Electric Corporation, New York, N.Y., a corporation of Delaware Filed Mar. 28, 1958, Ser. No. 724,620

Claims priority, application Great Britain Apr. 2, 1957

2 Claims. (Cl. 250—6)

This invention relates to a transmitter-receiver and to a communication system including a transmitter-receiver for an aircraft and a transmitter-receiver for communicating with the aircraft, and preferably relates to a single sideband communication system.

Due to the high velocity at which an aircraft may travel relative to a ground station, frequency shifts in a communication system will be experienced due to Doppler effect. A frequency shift of substantially one cycle per second per megacycle per second will be experienced at a relative speed of 600 knots, thus necessitating some form of frequency control in a system, as speeds and transmission frequencies are increased.

A frequency control system has been proposed for use with a single side band communication system in which the airborne transmitter and the ground station transmitter each transmit a pilot carrier with the single sideband signal and the receivers are provided each with an automatic frequency control system.

It is an object of the invention to provide an improved form of communication system.

The nature of the invention will now be described with reference to an embodiment shown in the drawing accompanying the provisional specification, in which drawing.

Figure 1:
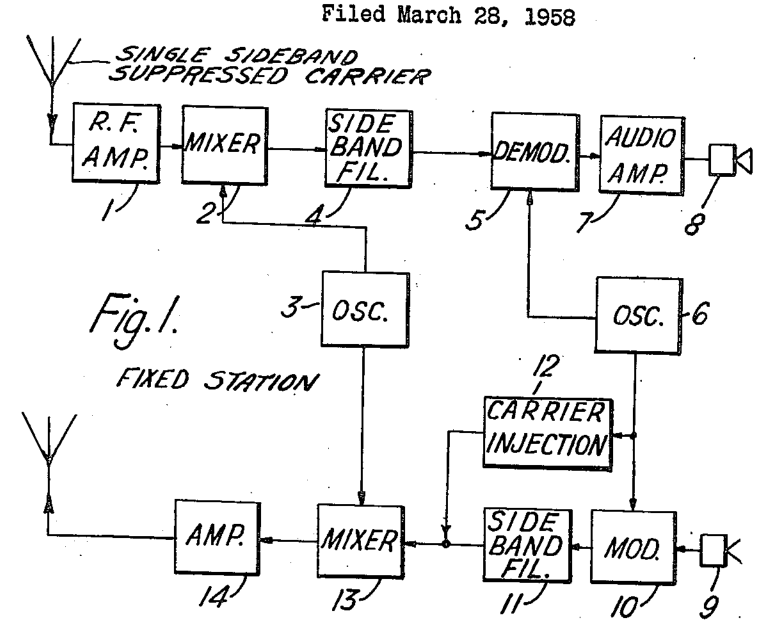
Fig. 1 is a block diagram of a transmitter-receiver for a ground station.
Figure 2:
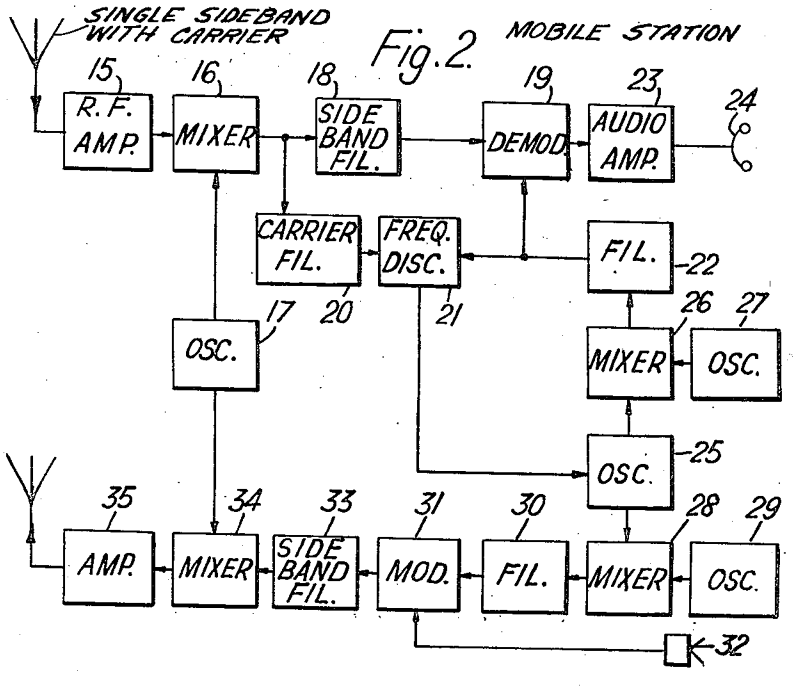
Fig. 2 is a block diagram of a transmitter-receiver for an aircraft, according to the invention.

The invention is also embodied in the system combining the transmitter receiver of Fig. 2 with the transmitter receiver of Fig. 1.

The communication system to be described in this embodiment is part of a multichannel communication system operating in the frequency range of 2 to 24 mc./s., but for the purpose of explanation it will be assumed that a single frequency of 5 mc./s. is employed. Different frequency ranges from these may alternatively be employed. The frequency of a received signal in the absence of Doppler shift is called the normal receiver frequency and the frequency of the transmitted signal in the absence of Doppler shift is called the normal transmitter frequency.

The receiver antenna of the ground station receiver shown in Fig. 1 receives from an airborne transmitter a single side band signal, say from 5,005 kc./s. to 5,000.2 kc./s. with the 5 mc./s. carrier suppressed, and this single side band signal is amplified in an R.F. amplifier 1 and fed to a mixer 2. A crystal controlled oscillator 3 is connected to the mixer and serves as a local oscillator, the frequency of the oscillations being chosen as 4.5 mc./s. Output from the mixer 2, including a band of frequencies 505 kc./s. to 500.2 kc./s., is fed through a side band filter 4, tuned to this range of frequencies, to a demodulator 5. The band of frequencies in the demodulator 5 is translated down to the appropriate position in the audio frequency spectrum by a crystal controlled oscillator 6 connected to the demodulator 5, the frequency of the oscillator 6 being 500 kc./s. The audio output from the demodulator is fed through an audio amplifier 7 to a loudspeaker or to headphones 8.

In the ground station transmitter, a microphone 9 is connected to the input of a modulator 10 to which the output from the crystal oscillator 6 is also fed. The 500 kc./s. frequency is amplitude modulated by the audio frequencies (say 200–5000 c./s.) from the microphone. A single sideband filter 11 is connected to the output of the modulator 10, for filtering the required single sideband signal (say 505 to 500.2 kc./s.) and the carrier 500 kc./s.) from the oscillator 6 is inserted by a carrier injection circuit 12 connected between the output of the oscillator 6 and the output of the filter 11. This signal (500 kc./s.+side band) is fed to a mixer 13 to which the oscillator 3 is also connected. The output from the mixer 13 is tuned to pass the 5 mc./s. carrier and the upper side band and this is fed through a linear power amplifier 14 to the transmitting antenna.

The signal transmitted by the ground station transmitter, comprising the carrier of 5 mc./s. plus the upper side band, is received by the receiver antenna of an airborne receiver shown in Fig. 2. The receiver signal is amplified in an R.F. amplifier 15 and fed to a mixer 16 to which output from a crystal controlled oscillator 17 is applied, the frequency of oscillator 17 being chosen as 4.5 mc./s. The output from the mixer 16 includes the frequency translated carrier 500 kc./s. and the frequency translated side band signal 505 to 500.2 kc./s. A sideband filter 18, whose bandwidth is greater than 505 to 500.2 kc./s. as will be more fully described hereinafter, is coupled to the output of mixer 16 and serves to feed the side band signal to a demodulator 19. A carrier filter 20 connected to the mixer 16, and having a certain bandwidth as will be more fully described, serves to feed the frequency translated carrier to a frequency discriminator 21. Output, (500 kc./s.), from a filter 22 is fed to the demodulator 19 and to the frequency discriminator 21. The audio signal from the demodulator 19 is fed through an audio amplifier 23 to headphones 24, and the output, if any, from the discriminator 21 is fed to a reactance controlled oscillator 25 tuned to 100 kc./s. A mixer 26, connected to the oscillator 25, is provided with a crystal controlled oscillator 27 tuned to 400 kc./s. and has its output connected to the filter 22 which is tuned to the sum of the frequencies from the oscillators 25 and 27.

Continuing the description of the airborne transmitter, the output from the oscillator 25 is connected to a mixer 28 and the output from a crystal controlled oscillator 29 (600 kc./s.) is also fed to the mixer 28. A filter 30 tuned to the difference frequency of the oscillators 25 and 29 is connected to the output of the mixer 28 and serves to feed this difference frequency (500 kc./s.), to a modulator 31 where this frequency is modulated by audio frequencies from a microphone 32. A sideband filter 33 in the output circuit of the modulator 31 serves to feed a single sideband signal to a mixer 34 which receives the frequency output at 4.5 mc./s. from the oscillator 17 and gives the upper sideband output which is fed through a linear power amplifier 35 to the transmitting antenna to be radiated to the ground station.

Assuming that the airborne transmitter-receiver is travelling at a speed of 600 knots toward the ground station at the moment of transmission from the latter, then the frequency of the normal receiver frequency of 5 mc./s. will be effectively increased by substantially 5 c./s. The sideband filter 18 and the filter 20 are designed to have bandwiths sufficient to accommodate the maximum possible variations from the normal receiver frequency. If the signal received by the airborne receiver has changed from a normal receiver frequency of 5 mc./s. to 5,000,010 c./s., then the sideband signal fed to the demodulator 19 will laso be changed to 505,010 to 500,210 c./s. instead of 505 to 500.2 ks./s. The carrier frequency fed to filter 20 will in this case be 500,010 c./s. instead of 500 kc./s. There will be a positive output from the discriminator 21 due to the difference in frequencies from filters 20 and 22, and this positive output will increase the frequency of the oscillator 25 from 100 kc./s. to 100,010 c./s. thereby increasing the frequency output of filter 22 from 500 kc./s. to 500,010 c./s. This latter frequency is fed to the demodulator 19 and translates the band of frequencies from filter 18 down to the exact position on the audio scale.

The increase in the frequency of the oscillator 25 results in a corresponding decrease in the frequency output from the filter 30 since the latter is tuned to the difference frequency of oscillators 25 and 29 that is, in the case considered 499,990 c./s. The carrier frequency of the transmission from the output of mixer 34 is thus 4.5 mc./s.+499.99 kc./s. Thus, as the frequency received by an airborne receiver is increased, the frequency transmitted by the airborne transmitter will be reduced by a frequency equal to the same frequency increase, thus ensuring that the single sideband signal will arrive at the ground station substantially at the correct frequency, namely the same frequency as is transmitted by the ground station. The automatic frequency control circuit in the airborne system is provided with a long enough time constant to ensure that there is no alteration until conditions are altered. It will be appreciated that compensation will similarly be effected if there is a decrease in frequency due to the aircraft travelling away from the ground station.

The communication system has been described in the above embodiment as employing only one carrier frequency for convenience namely one channel in the multichannel system. Actually the airborne transmitter-receiver and the ground station are only a part of a multichannel transmission system in which the airborne equipment can receive and transmit on any one of a plurality of frequency channels depending on which ground station it is tuned. Different frequencies for the oscillator 17 are derived from a precision master crystal controlled oscillator and suitable frequency synthesisers or the like. The tuning of the R.F. amplifier 15 is also controlled in accordance with the channel selected.

Forms of transmission other than single sideband transmission could be employed. Furthermore it will be appreciated that the automatic frequency control system and the associated network could be positioned in the ground station equipment instead of in the aircraft, namely the equipment illustrated in Fig. 2 could be located in the ground station and the equipment shown in Fig. 1 in the aircraft. In this latter case, the frequency transmitted by the ground station would be shifted in a direction and by an amount determined by the Doppler shift, instead of having to compensate for the shift in the aircraft.

It has been assumed in this description that the transmitter-receiver for the ground station and the transmitter receiver for the aircraft have been tuned to the same frequency namely 5 mc./s. A system could however be employed in which the normal receiver frequency and the normal transmitter frequency were different. In such a system the compensating shift in frequency of the transmitted signal is different from the shift in frequency from the normal receiver frequency because as previously stated the Doppler shift is dependent on frequency of transmission as well as on speed. Such an arrangement for correction would be obvious to those skilled in the art.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A transmitter-receiver for a single sideband radio communication system in which frequency shifts in signals received from a cooperating station are caused through Doppler effect comprising: a receiver portion and a transmitter portion; a stable receiver oscillator connected to said receiver portion; a stable transmitter oscillator connected to said transmitter portion; a reactance-controlled oscillator; first combining means connected to said stable receiver oscillator and to said reactance-controlled oscillator for combining the frequencies thereof; second combining means connected to said stable transmitter oscillator and to said reactance-controled oscillator for combining the frequencies thereof; the frequencies of said receiver oscillator, said transmitter oscillator and said reactance-controlled oscillator being chosen such that the output frequencies of said first and said second combining means contain a common frequency in the absence of said frequency shifts and vary in opposite directions when said frequency shifts are present in the received signals; control means including a discriminator, responsive to the frequency shifts due to said Doppler effect, connected to said reactance-controlled oscillator for varying the frequency thereof in accordance with said shifts; a demodulator in said receiver portion; means connecting the output of said first combining means to said demodulator for recovering said received signals; and modulator means connected to said second combining means to produce a modulated output signal.

2. A transmitter-receiver according to claim 1 wherein said first combining means comprises a mixer and a filter, said filter selecting the frequency equal to the sum of the frequencies of said stable receiver oscillator and said reactance controlled oscillator and wherein said second combining means also comprises a mixer and a filter, said last named filter selecting the frequency equal to the difference of the frequencies of said stable transmitter oscillator and said reactance-controlled oscillator.

References Cited in the file of this patent

UNITED STATES PATENTS

| | | |
|---|---|---|
| 2,528,632 | Woodworth et al. | Nov. 7, 1950 |
| 2,653,315 | Wheeler | Sept. 22, 1953 |
| 2,891,245 | Coogan | June 16, 1959 |

OTHER REFERENCES

IRE Transactions on Aeronautical and Navigational Electronics, Vol. ANE-4, No. 4, December 1957, p. 173.